Nov. 30, 1965        A. W. WERNER        3,220,911
CORRUGATING MACHINE
Filed Nov. 6, 1961        4 Sheets-Sheet 1

ARTHUR W. WERNER
INVENTOR.

BY
ATTORNEY

Nov. 30, 1965     A. W. WERNER     3,220,911

CORRUGATING MACHINE

Filed Nov. 6, 1961     4 Sheets-Sheet 2

ARTHUR W. WERNER
INVENTOR.

BY
ATTORNEY

ARTHUR W. WERNER
INVENTOR.

BY
ATTORNEY

Nov. 30, 1965
A. W. WERNER
3,220,911
CORRUGATING MACHINE
Filed Nov. 6, 1961
4 Sheets-Sheet 4
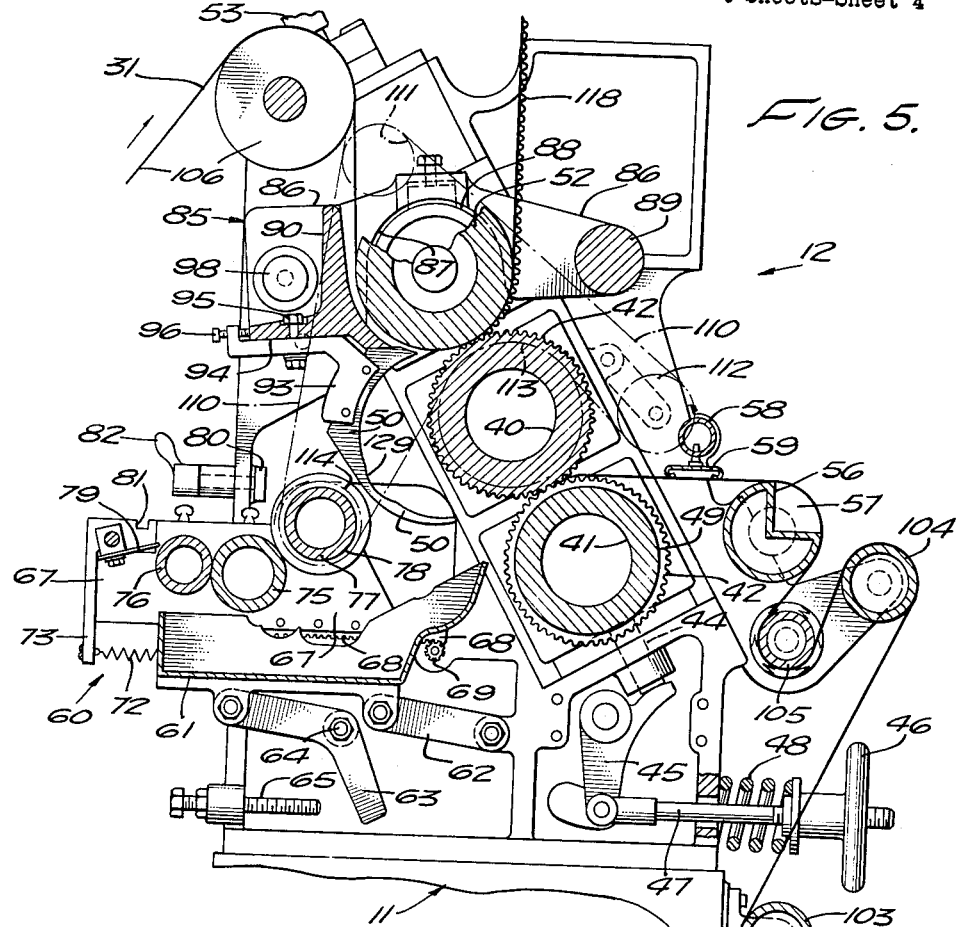
FIG. 5.
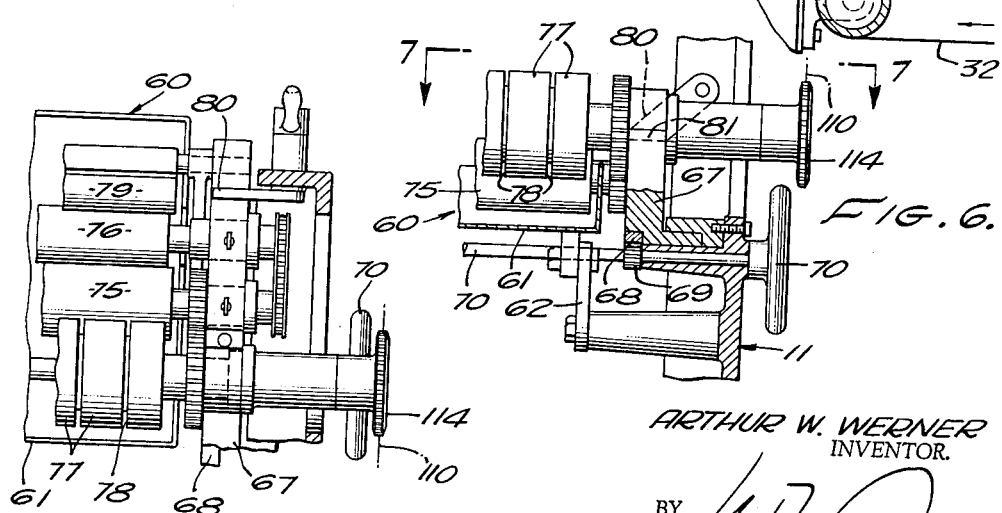
FIG. 6.
FIG. 7.
ARTHUR W. WERNER
INVENTOR.
BY
ATTORNEY

United States Patent Office 3,220,911
Patented Nov. 30, 1965

3,220,911
CORRUGATING MACHINE
Arthur W. Werner, 488 Panorama Drive,
Laguna Beach, Calif.
Filed Nov. 6, 1961, Ser. No. 150,540
10 Claims. (Cl. 156—473)

This invention relates to corrugating machines and more particularly to an improved machine of this type featuring unusual compactness achieved in part by a unique arrangement for feeding roll stock into the single facer assembly as well as into the double backer, and including various other mechanical and functional features and advantages not heretofore available in corrugating equipment.

Prior corrugating equipment is subject to numerous disadvantages and shortcomings avoided by the present invention. For example, prior machinery requires a great deal of floor space, particularly lengthwise of the equipment to provide for the supply of three or more strips of paper, adequate access for servicing the components, and excesive space for holding the finished product pressed together while being cured and dried.

Adequate provision for access to the components in prior designs has resulted in wide separation of the single facer and double backer assemblies. Prior attempts to avoid the undesirable consequences of this wide spacing have resulted in structures extremely difficult and time-consuming to service. Efforts made to avoid some of these problems have necessitated location of the raw paper stock in positions awkward to reach for both servicing and replenishment of fresh rolls of stock. Desirably, the supports for the stock rolls should be on the same level close to the floor and freely accessible at points outside the confines of the machine proper. In other words, the supports for rolls of paper stock should be in the open and so positioned as to be easily serviced by one man using either a floor-supported dolly, fork lift equipment or overhead crane equipment all operating exteriorly of the corrugating machine frame.

Another consideration of prime importance is the provision of an improved corrugating machine operable efficiently with a minimum size crew yet so versatile and flexible as to have an unusually wide output capacity ranging between two to fifteen million square feet per month. By reason of this fact, the invention machine is equally attractive to large volume producers of corrugated material as well as to ultimate consumers of the product.

The much lower cost of the present machine is achieved in part by making it much more compact than heretofore and in part by a much simpler design and arrangement of the components. The single facer assembly extends crosswise of the rear end of the machine at a point between the two sources of roll stock required to produce single face corrugated board. These two strips enter the forward and rear faces of the single facer while flowing in opposite directions with many attending advantages. The strip to be corrugated is located forwardly of the single facer and passes past the steam shower assembly and then rearwardly between the two corrugating rolls. This permits the glue applicating mechanism to be located rearwardly of the corrugating rolls and at the rearmost end of the machine where it is readily accessible for servicing and inspection, and isolated from the steam showers. The glue applicator embodies numerous novel features including provision for moving it away from the corrugating roll quickly and easily while maintaining the applicating rolls in continuous operation with attendant obvious advantages.

Another feature of considerable importance is the novel arrangement of the stripper fingers. These embrace the entire rear half of the upper corrugating roll and are rigidly and adjustably supported adjacent their upper ends on a counterweighted hinged support cradled on bearings concentric with the pressure roll. Simple latch pins serve to lock the stripper finger assembly releasably selectively in its normal operating position or in a non-operating position retracted from the corrugating roll. Another highly important feature of the stripper finger assembly is that the more rigid and firmly supported ends of the fingers are in the upper rear quadrant of the associated corrugating roll. This seemingly minor structural relationship has important advantages in that it is found to reduce or eliminate "false fluff-out" so characteristic of prior corrugating machines. By reducing false fluff-out, the present machine produces corrugated webs having unusually uniform corrugations of substantially identical shape, pitch and depth. In prior designs the corrugated web discharges from the smaller cross-section and less firmly supported end of the stripper fingers. The high temperatures under which these slender finger ends normally operate, invariably results in warpage of these ends away from corrugating rolls and leads to false fluff-out and the production of corrugated board of nonuniform character and having widely varying strength due to areas of alternately high-and-low as well as wide-and-narrow corrugations, as well as other imperfections adversely affecting board strength. It is found that by reversing the direction of flow of the corrugated material past the stripper fingers and employing fingers designed and supported in the manner disclosed in detail below, makes it possible to produce board consistently of the highest quality and uniformity.

The double backer assembly also exhibits innovations desired to be protected by the present invention. The facing strip required for double-faced board is supplied to the double backer from a supply roll at one side of the machine. This strip passes over a reversing shoe and then over guide rollers into a set of selectively power-driven feed rolls before passing over a preheating roll and into the double backer proper. Normally, the mentioned feed rolls are utilized as an aid in threading the facing strip into the double backer.

The double backer gluing station is located immediately forward of the upper portion of the single facer but in such manner as not to interfere with servicing the steam showers of the single facer. The closely coupled arrangement of the gluing station of the single facer greatly facilitates the drive of these components from the common prime mover and makes it feasible for a single crewman to supervise the operation of both the single facer and the double backer.

Another feature of the simplified corrugating machine is the use of a single prime mover located at the rear end of the machine and on the opposite side thereof from the two rolls of paper stock. The prime mover is coupled directedly to the main operating components and includes power transmission means extending to the forward end of the machine to drive the drying equipment, the slitter-creaser and the cut-off mechanism. The use of the described power means simplifies synchronization of the machine components. The latter objective is also facilitated by the provision of a combined overhead bridge and curing assembly supported cantilever-fashion above and rearwardly of the single facer.

With the foregoing shortcomings and disadvantages of prior constructions and the brief resume of salient features of the present invention in mind, it is an object of the present invention to provide a greatly simplified, compact and versatile corrugating machine for making corrugated board of unexcelled quality and uniformity.

Another object of the invention is the provision of a more easily serviced corrugating machine featuring unique provisions for feeding strip stock into both the rear end of the machine and from at least one side thereof.

Another object of the invention is the provision of a machine for manufacturing both single-faced and double-faced corrugated board of superior quality and uniform strength characteristics with two of the strips entering the machine while flowing in opposite directions as they enter processing components of the machine.

Another object of the invention is the provision of a single facer assembly for making corrugated board wherein the two strips of stock undergoing assembly enter the single facer from the opposite sides of this assembly.

Another object of the invention is the provision of a single facer assembly wherein the steam shower means for the sheet to be corrugated is located on the downstream side of the facer and wherein the glue applicating components are located on the upstream side remote from the steam shower means where the same are freely accessible for servicing from the rear end of the single facer.

Another object of the invention is the provision of a single facer having a glue applicator driven from the same source as the single facer and having provision for shifting the glue applicator into and out of operating position while maintaining the power drive to the applicator.

Another object of the invention is the provision of a single facer assembly having a unique stripper finger assembly quickly shiftable between operating and nonoperating positions and including simple lock means for holding it selectively in either position.

Another object of the invention is the provision of a machine for making corrugated board and having a double backer assembly located immediately forwardly but slightly above the single facer assembly and so arranged as to provide full accessibility to steam shower means for the single facer.

Another object of the invention is the provision of stripper finger means for transferring corrugated strip material to a particular one of a pair of corrugating rolls while holding the corrugated material firmly seated on the particular roll and safeguarding positively against the possibility of false fluff-out.

Another object of the invention is the provision of a simplified corrugating machine having a double backer assembly positioned immediately forwardly of a single facer assembly and featuring provision for feeding either one or two strips of raw paper stock into these two assemblies from positions laterally to one side of the double backer assembly as well as for feeding a third strip of paper stock into the single facer assembly and along a feed path parallel to the flow of all three strips through the machine.

Another object of the invention is the provision of a simplified compact corrugating machine having a single prime mover located laterally to one side of the machine and having synchronized drive connections to all power-driven components.

These and other more specific objects will appear upon reading the following specification and claims and upon considering in connection therewith the attached drawings to which they relate.

Referring now to the drawings in which preferred embodiments of the invention are illustrated.

FIGURE 5 is a view similar to FIGURE 3 but differing in showing both the hinged finger bar assembly and the glue applicator assemblies in their retracted positions to permit inspection and servicing of components;

FIGURE 6 is a fragmentary vertical sectional view through components at one end of the glue applicator to show constructional details;

FIGURE 7 is a fragmentary top plan view taken along line 7—7 on FIGURE 6;

FIGURE 8 is a fragmentary transverse sectional view on an enlarged scale through the nip area of the two corrugating rolls and showing features of the stripper finger construction;

FIGURE 9 is a fragmentary longitudinal sectional view along line 9—9 and showing details of the nip portion of the two corrugating rolls; and FIGURE 10 is a view similar to FIGURE 8 but taken through the nip area between the upper corrugating roll and the overlying pressure roll.

Figure 1:
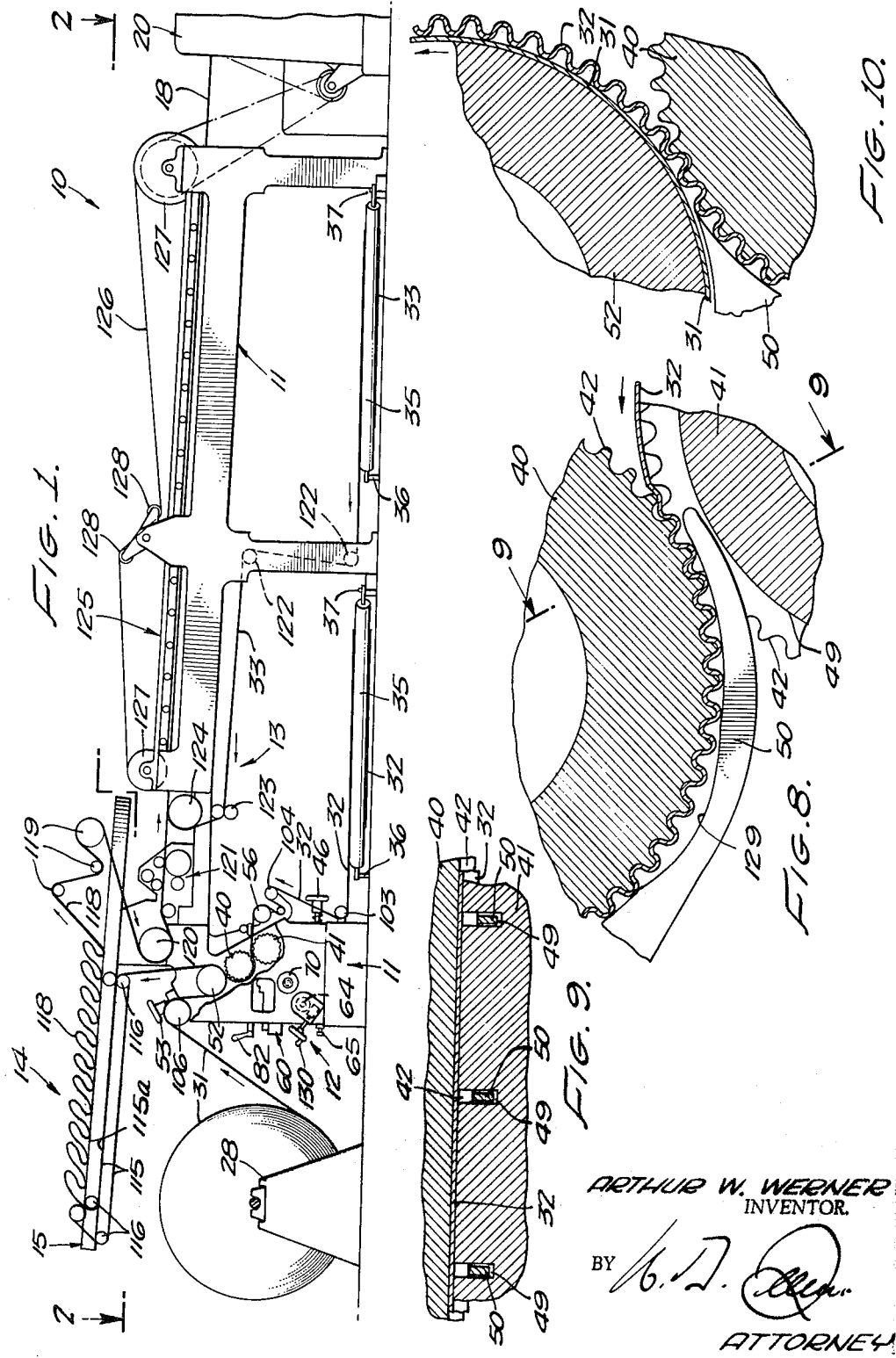
FIGURE 1 is a side elevational view of a machine for making corrugated board in accordance with the principles of the present invention, portions of the showing being schematic and parts of the machine being broken away for purposes of clarity.
Figure 2:
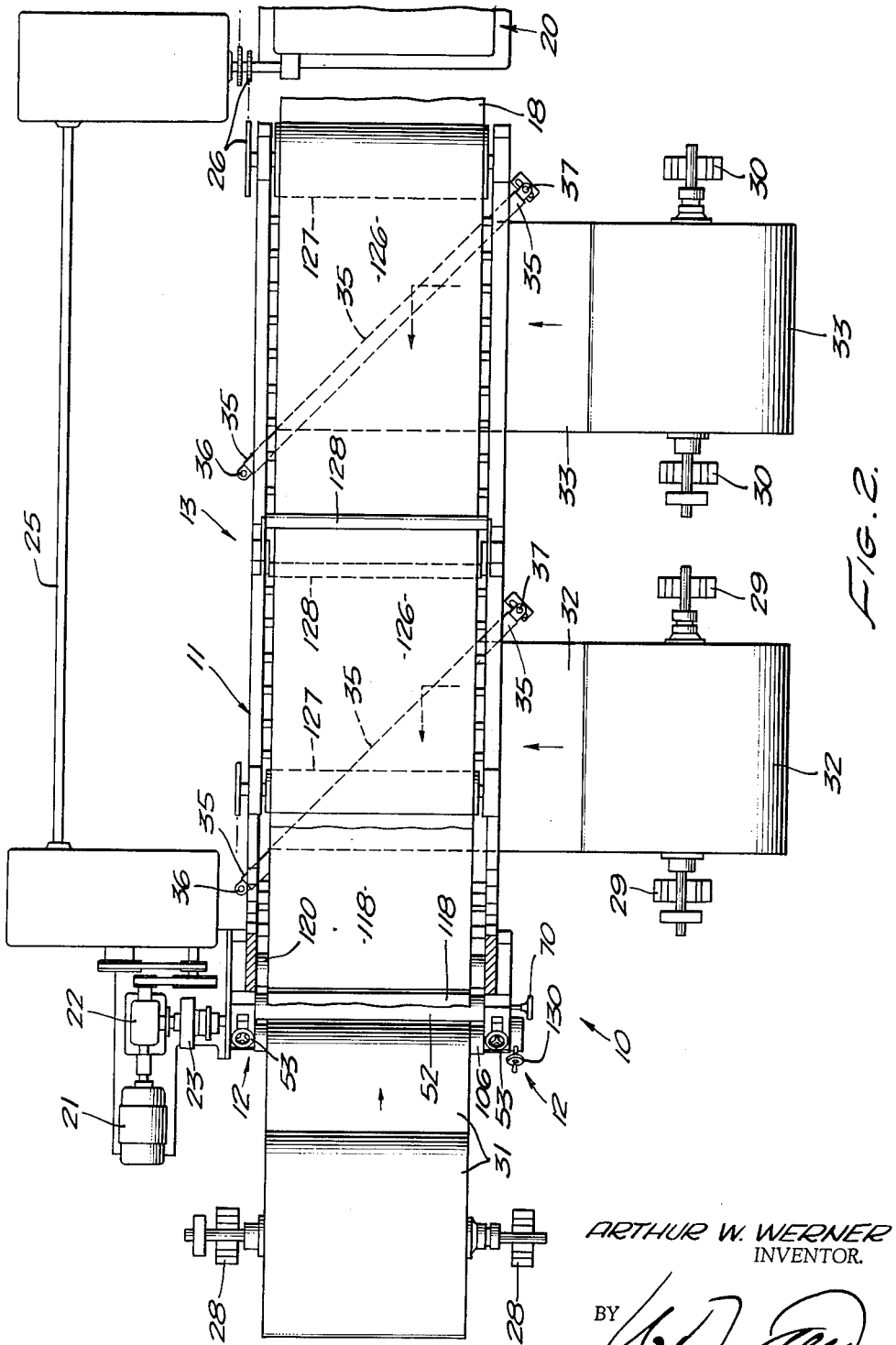
FIGURE 2 is a simplified top plan view of the machine shown in FIGURE 1 with parts broken away as is indicated by the broken line designated 2—2 on FIGURE 1.

Referring more particularly to FIGURES 1 and 2, there is shown a preferred embodiment of a corrugating machine designated generally 10. This machine has an elongated main frame 11 supporting as principal components, a single facer assembly 12 across its rear end and a double backer assembly immediately forward of the downstream side of the single facer assembly. Single-faced board is conveyed from the single facer into the double backer assembly by way of a combined overhead bridge and curing station designated generaly 14. The latter assembly is supported cantilever-fashion by a suitable framework 15 anchored at its forward end to the top of single facer assembly 12 and to frame 11. Finished board, whether of the single or double faced type 18, is discharged from the forward end of the double backer into suitable conventional slitting, creasing and cut-off equipment 20 forming no part of the present invention.

Referring more particularly to FIGURE 2, it is pointed out that corrugating machine 10 is preferably driven from a single prime mover 21 coupled through suitable speed reducing and torque converting mechanism 22 and a clutch 23 to single facer 12. Additional power transmission means 25 extends longitudinally along one side of the machine and is coupled in any suitable manner, as by drve means 26, to the forward end of the double backer 13 and the finished board processing equipment 20.

An important aspect of the overall assembly is the provision of separate means 28, 29 and 30 for supporting similar but separate rolls of flat strip paper stock 31, 32, 33 in areas closely spaced exteriorly of the machine proper and, desirably, in the manner shown in FIGURE 2. For example, the roll of flat facing stock 31 is supported directly rearwardly of the machine so as to feed directly into the upstream side of single facer assembly 12. The roll of strip stock 32 desired to be corrugated as well as the supply roll of the second facing strip 33, are both supported on axes offset laterally to one side of the machine and lying generally parallel to the path of travel of the board through the machine. In consequence, it is necessary to provide for the change in the direction of flow of these two strips as they enter the machine.

This is accomplished in the manner best shown in FIGURES 1 and 2 and comprises a guide shoe 35 for each of the two strips of paper. Guide shoes 35 extend crosswise of the lower portion of machine 10 and lie at an appropriate angle of 45 degrees to the longitudinal axis of the machine. The far ends of guide shoes 35 are pivotally supported as by pins 36, whereas the opposite ends are adjustably supported and clamps 37 in the proper position required to effect the flow of strips 32 and 33 into the machine. Although the axes for supply rolls 32 and 33 are shown as lying parallel to the longitudinal axis of machine 10, it will be apparent that these axes may be otherwise inclined provided appropriate provision is made for similarly changing the position of guide shoes 35, 35.

Figure 3:
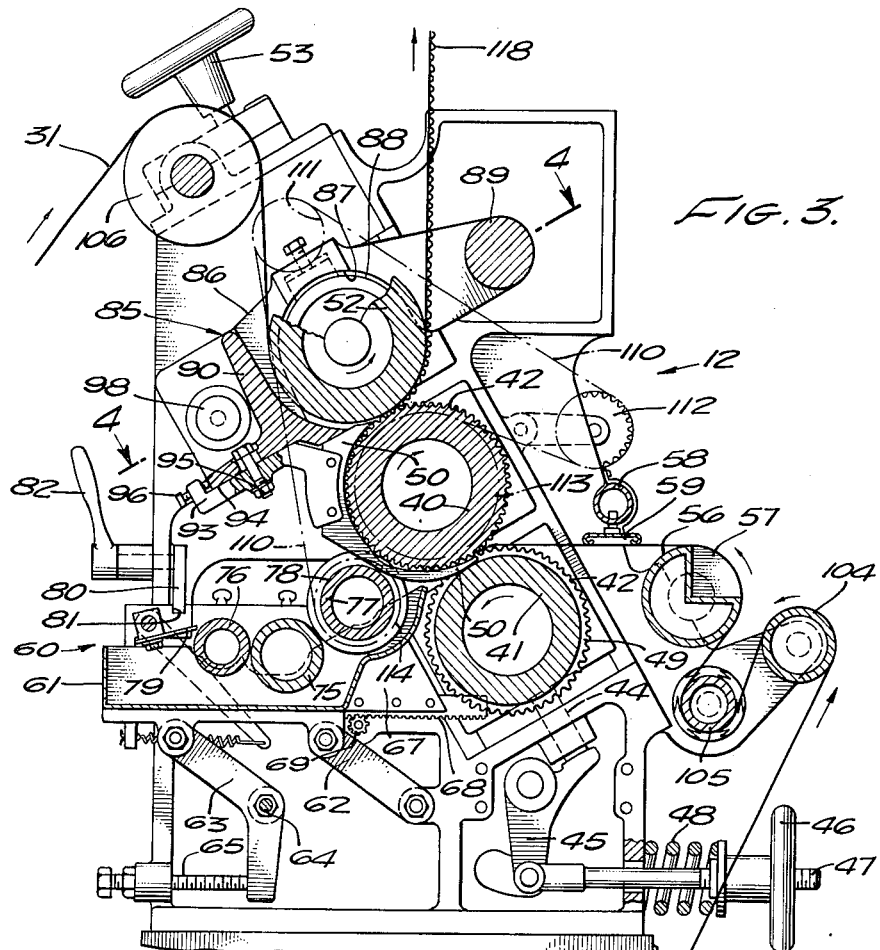
FIGURE 3 is a fragmentary vertical sectional view on an enlarged scale through the single facer assembly showing all components in their normal operating positions.

Referring now to FIGURE 3, essential features of the single facer assembly 12 will be described. The base and side frames 11 of this assembly form part of the frame of the main machine and, journalled in the opposite sides of this frame, are a pair of steam heated corrugating rolls 40, 41 longitudinally fluted as is indicated at 42 along their outer surfaces. The trunnions provided at the opposite ends of these rolls will be understood as including steam supply connections, not shown, of conventional character and by which these rolls can be heated to a suitable temperature. The journals for lower roller 41 are adjustable toward the underside or nip portion of upper roller 40 in any suitable manner, here shown, as comprising a reciprocal stem 44 bearing against one arm of a pivotally supported bell crank 45. This bell crank is adjustable by means of a hand wheel 46 supported on a threaded stem 47 in opposition to a stiff loading spring 48. It is also pointed out that roller 41 is provided with a series of narrow annular slots 49 to receive the ends of arcuate stripper fingers 50 spaced along and embracing the rear half of roller 40, as will be explained more fully presently.

The inclined bank of rollers forming essential components of the single facer includes an upper smooth-surfaced steam heated pressure roller 52 supported in journals slidably supported in the main frame 11. The journal boxes for roller 52 includes an adjusting hand wheel 53 for changing the pressure on heavy-duty pressure springs similar to springs 48, but not shown, and whereby the pressure applied on the finished single-faced board at the nip of the upper pair 40, 52 of rollers can be varied to suit operating requirements.

Supported forwardly of lower corrugating roll 41 is the means for steam-showering the incoming paper to be corrugated, thereby preheating and moistening the paper to facilitate its corrugation and subsequent processing. The shower assembly comprises a lower or main lower shower 56 extending crosswise of the main frame. This shower is of generally conventional construction, its 1:00 to 3:00 o'clock quadrant being provided with radially directly steam spraying nozzles positioned between radial partitions 57 having outer edges conforming in contour with the annular periphery of shower unit 56. Mounted above and rearwardly of main shower 56 is an upper shower 58 discharging into a downwardly directed channel-shaped member 59 having rounded lips bearing lightly against the upper surface of strip 32 immediately prior to its entry into the nip of corrugating rolls 40, 41.

Supported on the opposite side of the corrugating rolls from the steam shower assembly is a glue applicating assembly designated generally 60. This assembly includes a glue trough 61 extending crosswise of the machine and movably supported on a pair of links 62 and a pair of bell cranks 63 pivotally supported on frame 11 by a shaft 64 rotatable by a worm gear operated by a hand wheel 130 (FIGURE 1). Adjustable stop screws 65 carried by main frame 11 engage the lower end of bell cranks 63 to limit the forward movement of the glue pan 61 into its normal operating position.

Operatively associated with the described glue pan and supporting means therefor is a framework 67 supported along either interior side of the main frame and including a rack gear 68 mating with a pair of drive gears 69, the latter being rotatable by means of a shaft provided at one end with hand wheel 70 (FIGURE 6). This wheel, manipulatable from the exterior of the machine, is effective to shift glue applicating mechanism 60 between its operating position shown in FIGURE 3 and its retracted nonoperating position shown in FIGURE 5.

Journalled in glue applicator, frames 67, are a plurality of glue applicator rolls including a pick-up roll 75 having its lower portion normally submerged in the glue, a doctor roll 76, and an applicator roll proper 77. The latter roll is provided with a plurality of annular grooves 78 directly opposed to similar grooves 49 in the lower corrugating roll 41. Grooves 78 serve to receive and straddle the midportion of stripper fingers 50 in the manner made clear in FIGURE 3. A spring-pressed doctor plate 79 having its free edge positioned close to the surface of doctor roll 76 operates in known manner to control the thickness of the glue film transferred to applicator roll 77.

The means for holding applicator assembly 60 in its normal operating position, shown in FIGURE 3, includes a pair of latching dogs 80 pivotally supported in the main frame of the machine and having their free ends engageable in notches 81 in applicator frame 67. Dogs 80 are rotatable to their unlocked position by means of a hand lever 82.

The stripper finger assembly, designated generally 85, comprises a pair of end frame members 86 having an arcuate cut-out 87 in their midportions to permit these frames to be saddled upon a bearing surface 88 concentric with the axis of the pressure roll 52. The opposite ends or frames 86 are rigidly interconnected forwardly and rearwardly of pressure roll 52 by a counterweight 89 on the forward side of roll 52 and by the finger mounting member 90 lying immediately rearward of roll 52. It will therefore be understood that counterweight 89 and cross-frame 90 are rigidly secured to the saddle-shaped end frames 86 and that this entire unit is rotatable through a short arc about the axis of pressure roll 52, thereby permitting the stripper finger assembly to be shifted toward or away from corrugating roll 40.

Each of the stripper fingers 50 will now be described, particular reference being had to FIGURE 5. These identical fingers include a mounting bracket 93 seating in a groove 94 formed in the lower side of frame 90. The horizontal leg of the L-shaped brackets 93 is provided with an elongated slot through which a clamping bolt 95 extends. A set screw 96 carried at the rear end of brackets 93 abuts the edge of frame member 90 and aids in the precise adjustment of the fingers 50 when the supporting framework for these fingers is pivoted to its operating position. In this connection, it will be understood that the inner edge of fingers 50 is so adjusted relative to the crests of the flutes on roll 40 as to hold the corrugated strip 32 firmly seated against these flutes. As each of the fingers is properly adjusted, it is clamped firmly in place by tightening the nut of its clamping bolt 95.

Figure 4:
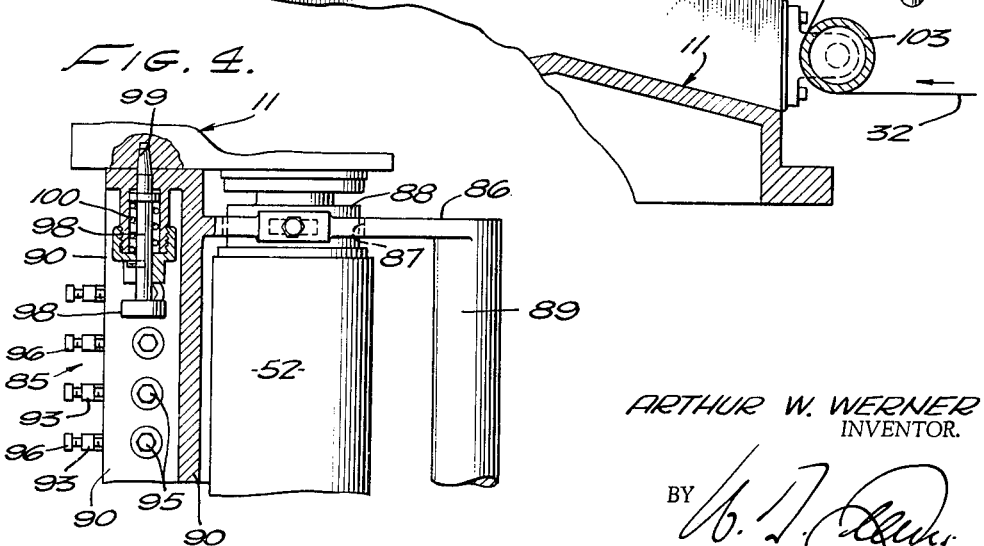
FIGURE 4 is a fragmentary detailed view of the hinged finger bar assembly taken along line 4—4 on FIGURE 3.

Main frame 86 of the finger supporting assembly is held selectively in its normal operating position or in its non-operating position by a pair of spring pressed locking pins 98 (FIGURE 4) reciprocably supported in the opposite ends of frames 90. The tapered ends of these locking pins 98 are urged toward locking position in one of the seating wells 99 by a spring 100 in the manner made clear by FIGURE 4.

The means for feeding the strip 32 to be corrugated into the single facer 12 includes lower and upper idler rollers 103 and 104, and a spring-biased tensioning roller 105. After passing over these rollers, strip 32 passes over the main steam shower 56 and beneath upper steam shower 58 into the lower nip of the corrugator in the manner shown in FIGURE 5. This strip then passes upwardly about the rear face of roll 40 where it merges with facing strip 31. Strip 31 is supplied from its supply roll over the upper side of the guide roller 106 and downwardly counterclockwise around the surface of the pressure roller 52.

A further important feature of the single facer relates to the unique means for driving the described rolls of the corrugator and of the glue applicator. This means includes a suitable chain belt drive indicated by the dot-and-dash line 110 on FIGURES 3 and 5. This chain meshes with drive sprocket 111 driven from the single power source 21 by suitable drive connections, as well as with the movably supported idler roller 112, the upper half of sprocket 113 keyed to the upper corrugated roller 40, and sprocket 114 keyed to glue applicator roll 77. By reason of the described arrangement of these components and, additionally, by reason of the spring-loaded pivotal support provided for idler sprocket 112, it will be understood that all three rolls of the glue applicator 60 continue to be driven irrespective of the position of the glue applicator including its operating and nonoperating positions. In connection with the glue applicator, it is pointed out that the three rolls of this device are desirably interconnected for positive drive by suitable meshing gears associated with each roll.

Referring now to FIGURE 1, it is pointed out that the combined overhead bridge and curing device 14 includes a suitable conveyor belt 115 trained over pulleys 116 in such maner as to feed the finished single faced product 118 rearwardly and then delivering the same onto the upper side of frame 15. There excess portions of the finished product 118 collect in serpentine form due to the slower movement of conveyor belts 115a prior to delivery over suitably supported preheating rollers 119 into the principal curing and drying section forming part of double backer 13.

Double backer assembly 13 includes a preheater roll 120 positioned immediately rearward of glue applicator 121 for the double backer. This glue applicator operates in known manner to apply a layer of glue to the exposed crests of the corrugated lamination of the single faced board, these crests being on the lower exposed face of the board as it passes through applicator 121.

The second and final facing sheet 33 enters from its supply roll, passing over the guide rolls 122 into the selectively power-driven feed rolls 123 underlying steam heated roll 124, the latter operating to press preheated strip 33 into contact with the previously glue coated crests of the corrugated lamination. The resulting completely assembled double-faced board 18 then passes horizontally through the heated curing device 125 while the three laminations are held pressed together under suitable pressure. This pressure is applied in part by a tensioned conveyor belt 126 passing over supporting rollers 127 at the opposite ends of the curing station and maintained tensioned by spring-biased manually-adjustable idling rollers 128.

Operation

The operation of the corrugating machine described above will be quite apparent from the detailed description of the major subassemblies and their components. Assuming that double-faced corrugating board is to be produced, it will be understood that three strips of paper 31, 32 and 33 are fed into the machine from their respective three supply rolls, strip 31 being fed directly downstream from the rear of back facer assembly 12. Strip 32 to be corrugated enters laterally from the side of the machine, passing over the reversing shoe 35 and then upwardly and rearwardly into the forward side of single facer assembly 12. As it does so, the strip passes between the upper and lower steam showers 56, 58, respectively, and into the nip portion of corrugating rolls 40, 41. As it passes the showers, the strip is saturated with hot steam and water vapor to preheat and soften the strip prior to its corrugation. The actual corrugating is performed in the nip of rolls 40 and 41 immediately following which the corrugating strip is transferred onto upper roll 40 by the automatic action of stripper fingers 50 in the manner made clear by FIGURE 8.

It is pointed out that the inner edge of fingers 50 is relieved through a short arc indicated at 129 thereby permitting the corrugated strip to fluff away from flutes 42 of the upper roll to the limited extent permitted by the shallow relief 129. It will be observed from a consideration of FIGURE 3 that relief 129 is radially opposite the area of tangency of glue applicator roll 77 with roll 40. It will therefore be recognized that the described limited fluff-out of the corrugated strip permitted by cut-aways 129 permits the crests of this portion of the stock to be coated with glue without risk of coating the crests of the flutes on either side of strip 32. The significance of this is that it permits paper of any width to be corrugated in the described machine without risk of glue being transferred to the corrugating rolls.

Immediately that the corrugated strip has been supplied with glue, fingers 50 function to return the corrugated strip firmly back into seating engagement with the flutes and to hold it there until the glue-coated corrugated strip passes into the nip of roll 40 with pressure roll 52. At this nip, the corrugated strip is pressed against facing strip 31. The still hot and moist single face board 118 then passes into the overhead bridge and curing assembly 14 where further drying takes place as any excess quantities of the board collect in sinuous form along the upper surface of frame 15.

The single face board is now ready for assembly to the second face sheet 33 in double backer 13. This face strip is supplied from a roll positioned to the side of the machine similarly to roll 32 and passes over reversing shoe 35 and past idlers 122 into the selectively driven feed rollers 123. Once strip 33 has been threaded into the double backer, the clutch (not shown) for feed rollers 123 is declutched allowing these to operate as idlers. Strip 33 passes over steam heated roll 124 and is pressed against the glue-coated crests of board 118 as it enters the curing and drying apparatus 125. Glue is applied to the exposed crests of the corrugated strip as it passes over the applicator roll of glue applicator 121.

It will be understood that curing apparatus 125 is of generally conventional construction, heat and pressure being there applied sufficient to accelerate final curing. The finished continuous board 18 then passes into the creasing and slitting apparatus 20 prior to being divided into plaques of desired length for packaging and delivery to the point of use.

Should it be necessary or desirable to gain access to the corrugator rolls for inspection or servicing at any time, or to replace or to recondition fingers 50, the operator need but unlock the glue applicator by rotation of handle 82 to disengage dog 80 from notch 81. Hand wheels 70 and 130 are then rotated in a direction to drive pinions 69 and shaft 64, thereby shifting both frame 67 supporting the glue applicator rolls and glue pan 61 rearwardly away from the corrugator. During this operation it is unnecessary to discontinue the power drive to either the corrugator or the glue applicator. Once the gluing components have been shifted rearwardly, the operator disengages locking pins 98 from wells 99, thereby releasing stripper finger assembly 85 for free-swinging pivotal movement about the axis of roller 52 to its retracted position, as shown in FIGURE 5 where it is locked by reengagement of pins 98 with another set of wells 99.

While the particular corrugating machine herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:
1. In a machine for producing a continuous strip of single faced corrugated material, a single facer assembly comprising, a main frame, a stack of rolls rotatably supported in said frame including a lower pair of longitudinally-fluted intermeshed corrugating rolls positioned to corrugate paper strip stock fed therebetween, an upper smooth-surfaced pressure roll closely spaced to the upper side of the upper one of said corrugating rolls, steam shower means located closely forwardly of said corrugating rolls, means for feeding paper stripping from a roll supply thereof located forwardly of said single facer assembly on an obtuse angle to said corrugating rolls past said steam shower means and then rearwardly between said corrugating rolls, power driven means on the opposite side of said corrugating rolls from said steam shower for applying glue to the crests of the corrugated strip passing upwardly on the surface of the upper one of said pair of corrugating rolls, means for feeding a continuous strip of flat stock under tension over the surface of said smooth-surfaced upper roll into contact with the still moist glue on the crests of said corrugated strip, a single source of power connected to drive all of said rolls and said gluing means in synchronism, a plurality of arcuate stripper fingers extending parallel to one another and lying in right planes spaced axially of and embracing the rear face of the upper one of said corrugating rolls, said stripper fingers being effective to hold said corrugated strip seated on the flutes of said upper corrugated roll while drying and taking a set, common support means for said stripper fingers, and means for moving said common support means to shift said fingers bodily rearwardly away from said corrugating roll to provide free access to said fingers and to the rear of said rolls.

2. A machine as defined in claim 1 characterized in the provision of frame means movable independently of and relative to the frame of said single facer assembly and supporting said glue applying means, and means for bodily shifting said power driven glue applying means and the frame means therefor bodily toward and away from the rear side of said upper corrugating roll while maintaining a continuous operating drive to said glue applying means.

3. A machine as defined in claim 1 characterized in the provision of frame means movable independently of and relative to the frame of said single facer assembly and supporting said power driven glue applying means, and means for bodily shifting said power driven glue applying means and the frame means therefore toward and away from the rear side of said upper corrugating roll.

4. A machine as defined in claim 3 characterized in that said common drive means includes mechanical means effective to continue driving said power driven glue applying means irrespective of whether the same is shifted into or out of gluing relation to corrugated paper passing upwardly over the area side of said upper corrugating roll.

5. A machine for making single faced corrugated paper comprising, a main frame supporting a pair of fluted corrugating rolls and a smooth-surfaced pressure roll in an inclined bank with said pressure roll uppermost, glue-applicator means positioned along the rear upstream side of the upper corrugated roll, a plurality of thin arcuate stripper fingers embracing the rear side of said upper corrugated roll and effective to guide corrugated stripping off from the lower corrugated roll and past said glue applicator means onto said pressure roll, means for driving all of said rolls and said glue applicator means including means for shifting power driven portions of said glue applicator means toward and away from said upper corrugating roll while continuing the power drive thereto, means movably supporting said stripper fingers for movement through a limited path toward and away from the rear side of said upper corrugated roll, and said means movably supporting said stripper fingers including counterweight means arranged to counterbalance a major portion of the weight of said fingers.

6. A machine as defined in claim 5 wherein said support for said fingers and the counterweight therefor are positioned opposite the rear and forward faces respectively of said pressure roll and journaled to pivot about the axis of said pressure roll.

7. In combination, a compact paperboard fabricating machine having a single facer assembly provided with a pair of corrugating rolls and a pressure roll having their axes in a common plane and with said pressure roll uppermost, a double backer assembly mounted in tandem with the upper end of said single facer assembly, common power drive means connected to said single facer and double backer assemblies to drive the same in unison, drier means extending downstream from said double backer assembly, first and second non-rotating guide shoes extending crosswise beneath the rear and forward ends respectively of said drier and lying at approximately 45 degrees to the longitudinal axis of said drier, first and second supports for first and second supply rolls of paper positioned laterally of the exterior side of said drier directly opposite said first and second guide shoes, a third support for a third supply roll of paper extending crosswise of the upstream side of said single facer assembly, means including said first and second guide shoes for feeding paper from said second and third supply rolls into said single facer and double backer assemblies for application to the opposite faces of paper from said first roll after the same has passed through said pair of corrugating rolls, and said single facer and double backer assemblies each including means for applying adhesive to the crests of corrugations formed in paper from said first supply roll.

8. In combination, a compact paperboard fabricating machine having an elongated main frame provided across its upper end with a single facer assembly, a double backer assembly following the upper end of said single facer assembly on the downstream side thereof, an elongated paperboard drier extending lengthwise of the upper side of said frame throughout the major length thereof, means for supporting first and second supply rolls of paper laterally of the upper and lower ends of said drier with their axes generally parallel to the length of said drier, separate non-rotating guide shoes supported horizontally across and beneath the upper and lower ends respectively of said drier with their forward edges inclined at substantially 45 degress to the drier axis, means cooperating with said guide shoes effective to guide strips of paper from said first and second rolls to a path of travel passing rearwardly beneath said drier with said first strip entering the forward side of said single facer assembly and said second strip entering the forward end of said double facer assembly, third means supporting a third supply roll of paper crosswise and rearwardly of said single facer assembly, means for passing paper from said third supply roll into the rear side of said single facer assembly, said single facer assembly including a pair of mating corrugated rolls cooperating to corrugate one of said first and second strips of paper crosswise thereof, adhesive coating means across the rear end of said single facer assembly for applying adhesive to the corrugation crests on one side of said corrugated strip to bond the latter to one of said second and third strips, and adhesive coating means located crosswise of the forwardly facing side of said single facer assembly and beneath said double backer assembly for applying adhesive to the crests of the corrugations on the other side of said corrugated strip to bond the latter to the other of said second and third strips.

9. The combination defined in claim 8 characterized in the provision of overhead bridge means overlying said single facer and double backer assemblies and projecting rearwardly of said main frame, means for conveying laminated paperboard issuing from the top of said single facer assembly onto said overhead bridge means and therefrom downwardly into said double backer assembly for lamination to another face strip as the same passes forwardly through said double backer assembly and into the rear end of said drier, and means for passing the assembled paperboard along said drier and discharging the same from the front end of said fabricating machine.

10. In combination, a compact paperboard fabricating machine for making paperboard having a transversely corrugated strip sandwiched between a pair of flat face strips, said fabricating machine comprising an elongated main frame having a long drier extending generally horizontally along the upper portion of said frame and terminating forwardly of the rear end thereof, a single facer assembly at the rear end of said main frame, a double backer assembly interposed between the rear end of said drier and the upper portion of said single facer assembly, first, second and third paper roll supporting means arranged one across the rear end of said main frame and two in general axial alignment with their axes generally parallel to and along one exterior lateral side of said drier adjacent the front and rear portions thereof, each of said roll supporting means being freely accessible for simultaneous servicing entirely exteriorly of said main frame and without interference with one another or with said fabricating machine, separate non-rotating guide shoe means extending diagonally across the upper and lower ends of said drier on the underside thereof opposite the respective ones of said last mentioned roll supporting means and cooperable therewith to guide a strip of paper from an associated one of said last mentioned roll supporting means rearwardly lengthwise of said machine with one strip entering the forward side of said single facer assembly and a second strip entering the lower forward portion of said double backer assembly, means for guiding a strip of paper from the roll supporting means across the rear end of said machine forwardly into said single facer assembly, said single facer assembly including means for transversely corrugating one of said strips, means for adhesively bonding the crests on one side of said corrugated strip to the other strip fed into said single facer assembly, means carried by said double backer assembly for adhesively bonding the crests on the other side of said corrugated strip to the strip fed into the lower forward end of said double backer assembly prior to the entry of the paperboard product into the rear end of said drier, and means for advancing the paperboard product forwardly to the front end of said drier.

References Cited by the Examiner

UNITED STATES PATENTS

| 1,106,502 | 8/1914 | Ferres | 156—473 |
| 1,610,671 | 12/1926 | Funk | 226—197 |
| 1,835,816 | 12/1931 | Sieg | 156—473 |
| 1,858,375 | 5/1932 | Schroeder et al. | 156—473 |
| 2,213,157 | 8/1940 | Bren | 270—52 |
| 2,289,909 | 7/1942 | Greenwood | 156—472 |
| 2,674,299 | 4/1954 | Brucker | 156—473 |
| 3,077,222 | 2/1963 | Shanley | 156—473 |

FOREIGN PATENTS 1,180,114   12/1958   France.

EARL M. BERGERT, *Primary Examiner.*

UNITED STATES PATENT OFFICE
CERTIFICATE OF CORRECTION

Patent No. 3,220,911                          November 30, 1965

Arthur W. Werner

It is hereby certified that error appears in the above numbered patent requiring correction and that the said Letters Patent should read as corrected below.

Column 9, line 47, for "area" read -- rear --.

Signed and sealed this 18th day of October 1966.

(SEAL)
Attest:

ERNEST W. SWIDER                              EDWARD J. BRENNER
Attesting Officer                                     Commissioner of Patents